United States Patent
Sanchez Rola et al.

(10) Patent No.: US 12,355,812 B1
(45) Date of Patent: Jul. 8, 2025

(54) SYSTEMS AND METHODS FOR PROTECTING AGAINST CREDENTIAL THEFT BY IMPERSONATOR APPLICATIONS

(71) Applicant: GEN DIGITAL INC., Tempe, AZ (US)

(72) Inventors: Iskander Sanchez Rola, Antibes (FR); Venkadesan Marimuthu, Chennai (IN)

(73) Assignee: Gen Digital Inc., Tempe, AZ (US)

( * ) Notice: Subject to any disclaimer, the term of this patent is extended or adjusted under 35 U.S.C. 154(b) by 205 days.

(21) Appl. No.: 18/160,113

(22) Filed: Jan. 26, 2023

(51) Int. Cl.
*H04L 9/40* (2022.01)

(52) U.S. Cl.
CPC ........ *H04L 63/1483* (2013.01); *H04L 63/101* (2013.01)

(58) Field of Classification Search
CPC ..... H04L 63/1483; H04L 63/10; H04L 63/12; H04L 63/1416; H04L 63/20; H04L 63/101
See application file for complete search history.

(56) References Cited

U.S. PATENT DOCUMENTS

| | | | | |
|---|---|---|---|---|
| 8,458,304 B1* | 6/2013 | Reeves | .................... | H04W 4/00 709/220 |
| 8,650,614 B2* | 2/2014 | Nahari | .................. | H04W 12/10 713/168 |
| 9,331,990 B2* | 5/2016 | Le Saint | .......... | G06Q 20/38215 |
| 9,881,143 B2* | 1/2018 | Vanderveen | ........ | H04W 12/106 |
| 11,522,890 B2* | 12/2022 | O'Neil | .................. | H04L 41/145 |
| 11,526,620 B2* | 12/2022 | Kukehalli Subramanya | ............... | G06F 21/335 |
| 11,556,653 B1* | 1/2023 | Han | ....................... | G06F 21/577 |
| 11,876,833 B2* | 1/2024 | Lyle | ..................... | H04L 47/2441 |
| 11,949,693 B2* | 4/2024 | Thomson | ............ | H04L 63/1483 |
| 11,997,115 B1* | 5/2024 | Higbee | .................... | G06F 16/35 |
| 12,021,897 B2* | 6/2024 | Manoria | ............. | G06F 21/6218 |
| 12,058,176 B1* | 8/2024 | Subramanian | ...... | H04L 63/1483 |
| 12,063,249 B2* | 8/2024 | Keiter | .................... | G06V 40/33 |

OTHER PUBLICATIONS

"Enable automatic sign-in across apps and websites," Google, LLC, https://developers.google.com/identity/smartlock-passwords/android/associate-apps-and-sites, Nov. 4, 2022, pp. 1-8 (retrieved on Jan. 30, 2023).

* cited by examiner

*Primary Examiner* — Hosuk Song
(74) *Attorney, Agent, or Firm* — Greenberg Traurig, LLP (57) ABSTRACT

The disclosed computer-implemented method for protecting against credential theft by impersonator applications may include (i) identifying an ownership relationship between each of a group of applications and a group of websites, (ii) generating a preliminary list containing the applications identified as having the ownership relationship with the websites, (iii) determining missing ownership relationships for the applications and the websites in the preliminary list, (iv) updating the preliminary list with the missing ownership relationships to create a trusted list of applications and websites, and (v) performing a security action that protects against a credential theft attack by referencing the trusted list to detect potential impersonator applications attempting to steal user credentials. Various other methods, systems, and computer-readable media are also disclosed.

20 Claims, 9 Drawing Sheets

SYSTEMS AND METHODS FOR PROTECTING AGAINST CREDENTIAL THEFT BY IMPERSONATOR APPLICATIONS

BACKGROUND

Mobile computing devices are increasingly targeted by impersonator applications (i.e., mobile applications that mimic legitimate ones) designed to trick password managers and users into providing data and/or credentials (e.g., usernames/passwords) for malicious purposes (e.g., collecting sensitive user information, such as financial and biometric information that may be utilized to take over user accounts or redirect payments, selling user personal information on the Dark Web, etc.). For example, impersonator applications may be configured to trick password managers with false package names associated with legitimate mobile applications while users may be tricked by applications having similar names and/or user interface elements corresponding to their legitimate counterparts.

Traditional approaches for preventing users from installing impersonator applications may include the use of manually curated lists of a limited number of mobile applications (e.g., the most popular applications downloaded on an application marketplace) or the use of digital asset link protocols that utilize web links for routing installations requests to verified (i.e., legitimate) corresponding mobile applications hosted on application marketplaces. However, manual list curation fails to prevent the impersonation of corresponding non-listed applications while the use of digital asset link or similar protocols may often be limited as they are only utilized by a small number of mobile applications and require application developers to opt-in for implementation, thereby leaving the vast majority of users vulnerable.

SUMMARY

As will be described in greater detail below, the present disclosure describes various systems and methods for protecting against credential theft by impersonator applications.

In one example, a method for protecting against credential theft by impersonator applications may include (i) identifying, by one or more computing devices, an ownership relationship between each of a group of applications and a group of websites, (ii) generating, by the one or more computing devices, a preliminary list containing the applications identified as having the ownership relationship with the websites, (iii) determining, by the one or more computing devices, missing ownership relationships for one or more of the applications and one or more of the websites in the preliminary list, (iv) updating, by the one or more computing devices, the preliminary list with the missing ownership relationships to create a trusted list of applications and websites, and (v) performing, by the one or more computing devices, a security action that protects against a credential theft attack by referencing the trusted list to detect potential impersonator applications attempting to steal user credentials.

In some examples, the ownership relationships may be identified by (i) analyzing telemetry data for one or more target applications in the plurality of applications to detect a reference to one or more target websites in the plurality of websites, (ii) analyzing telemetry data for the one or more target websites to detect a reference to the one or more target applications, and (iii) identifying the ownership relationship based on detecting the reference in the telemetry data for the one more or target applications and the one or more target websites. In some embodiments, analyzing the telemetry data for the one or more target applications may include accessing application marketplace data associated with the target applications. In some embodiments, analyzing the telemetry data for the one or more target websites may include accessing password manager login form data.

In some examples, determining the missing ownership relationships for the applications and websites in the preliminary list may include detecting that an application signature for at least one additional application is related to an application signature for the one or more of the applications in the preliminary list. Additionally, determining the missing ownership relationships for the applications and websites in the preliminary list may include detecting that a website certificate for at least one additional website is related to a website certificate for the one or more of the websites in the preliminary list.

In some examples, performing the security action may include (i) detecting an autofill request from a candidate application for the user credentials, (ii) comparing the candidate application to the trusted list of applications and websites, and (iii) determining that the candidate application is a potential impersonator application when the candidate application is absent from the trusted list of applications and websites. Additionally, this security action may include (i) rejecting the autofill request and (ii) generating a notification of the potential impersonator application. In some examples, another the security action may include (i) detecting an insert operation of user credentials for accessing an unknown application by a user, (ii) identifying, based on application usage telemetry data, a previous application utilized by the user, (iii) comparing the previous application to the trusted list of applications and websites, and (iv) determining that the pervious application is a potential impersonator application when the previous application is absent from the trusted list of applications and websites. Additionally, this security action may include comprising generating a notification of the potential impersonator application.

In one embodiment, a system for protecting against credential theft by impersonator applications include at least one physical processor and physical memory that includes a set of modules and computer-executable instructions that, when executed by the physical processor, cause the physical processor to (i) identify, by an identification module, an ownership relationship between each of a group of applications and a group of websites, (ii) generate, by a relationship module, a preliminary list containing the applications identified as having the ownership relationship with the websites, (iii) determine, by a cluster module, missing ownership relationships for one or more of the applications and one or more of the websites in the preliminary list, (iv) update, by a list update module, the preliminary list with the missing ownership relationships to create a trusted list of applications and websites, and (v) perform, by a security module, a security action that protects against a credential theft attack by referencing the trusted list to detect potential impersonator applications attempting to steal user credentials.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) identify an ownership relationship between each of a group of applications and a group of websites, (ii) generate a preliminary list containing the applications identified as having the ownership relationship with the websites, (iii) determine missing ownership relationships for one or more of the applications and one or more of the websites in the preliminary list, (iv) update the preliminary list with the missing ownership relationships to create a trusted list of applications and websites, and (v) perform a security action that protects against a credential theft attack by referencing the trusted list to detect potential impersonator applications attempting to steal user credentials.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the present disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to systems and methods for protecting against credential theft by impersonator applications. As will be described in greater detail below, the systems and methods described herein may utilize multiple data sources (e.g., website and application marketplace telemetry) to create a list that attributes ownership of applications to specific websites and further utilize dynamic impersonation detection to prevent password managers from utilizing "autofill" credential functionality and/or prevent users from providing credentials to non-listed applications that may be potential application impersonators. By generating the application attribution ownership lists and utilizing dynamic impersonation in this way, the systems and methods described herein may provide to provide for the automatic and platform agnostic identification of likely impersonator applications targeting both password manager applications and mobile device users, thereby preventing credential theft by malicious actors. In addition, the systems and methods described herein may improve the improve the technical field of mobile computing device security by detecting potential impersonator applications and preventing the submission of credentials to these applications via password manager autofill functionality or user insert actions.

Figure 1:
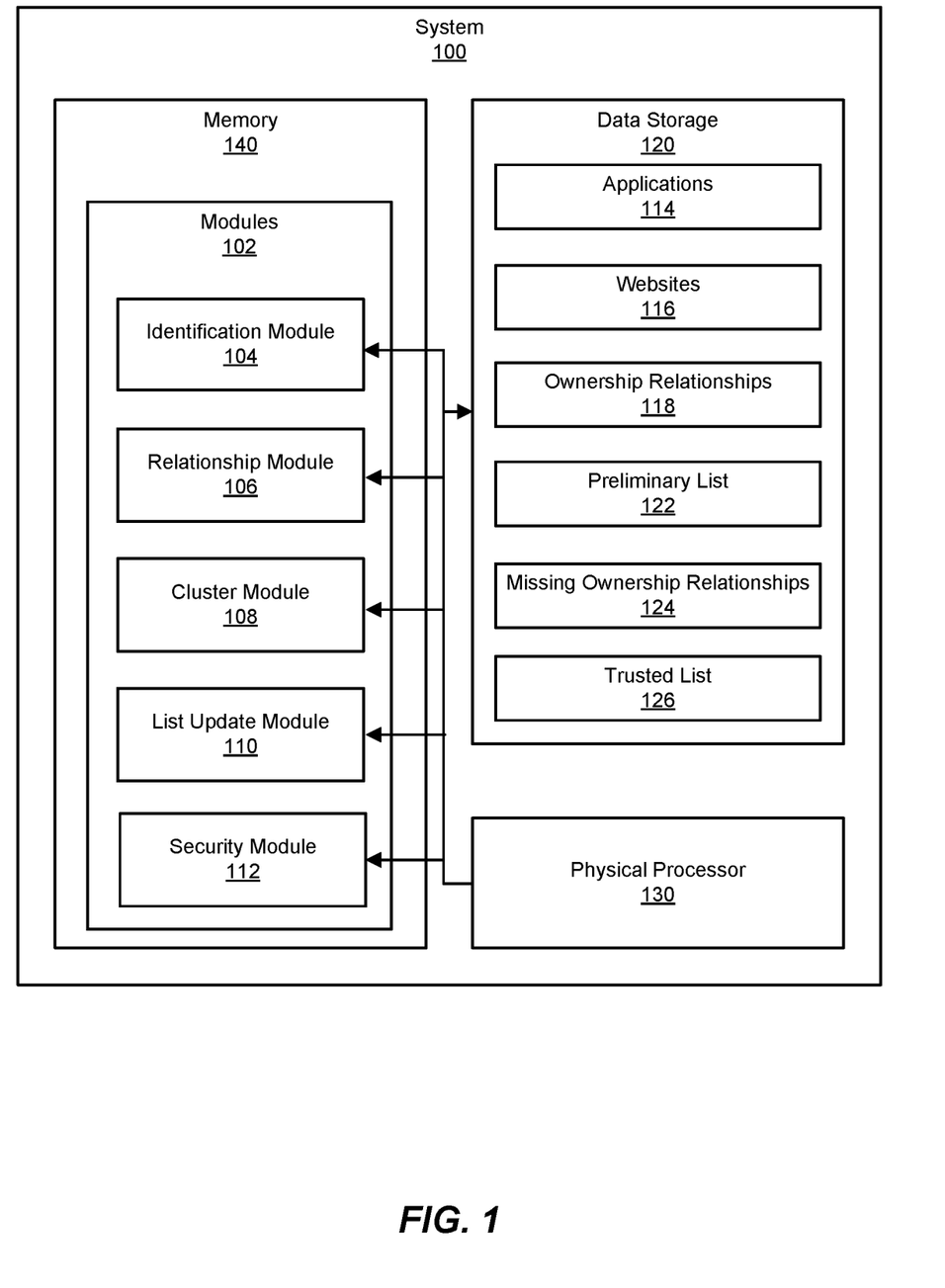
FIG. 1 is a block diagram of an example system for protecting against credential theft by impersonator applications.
Figure 2:
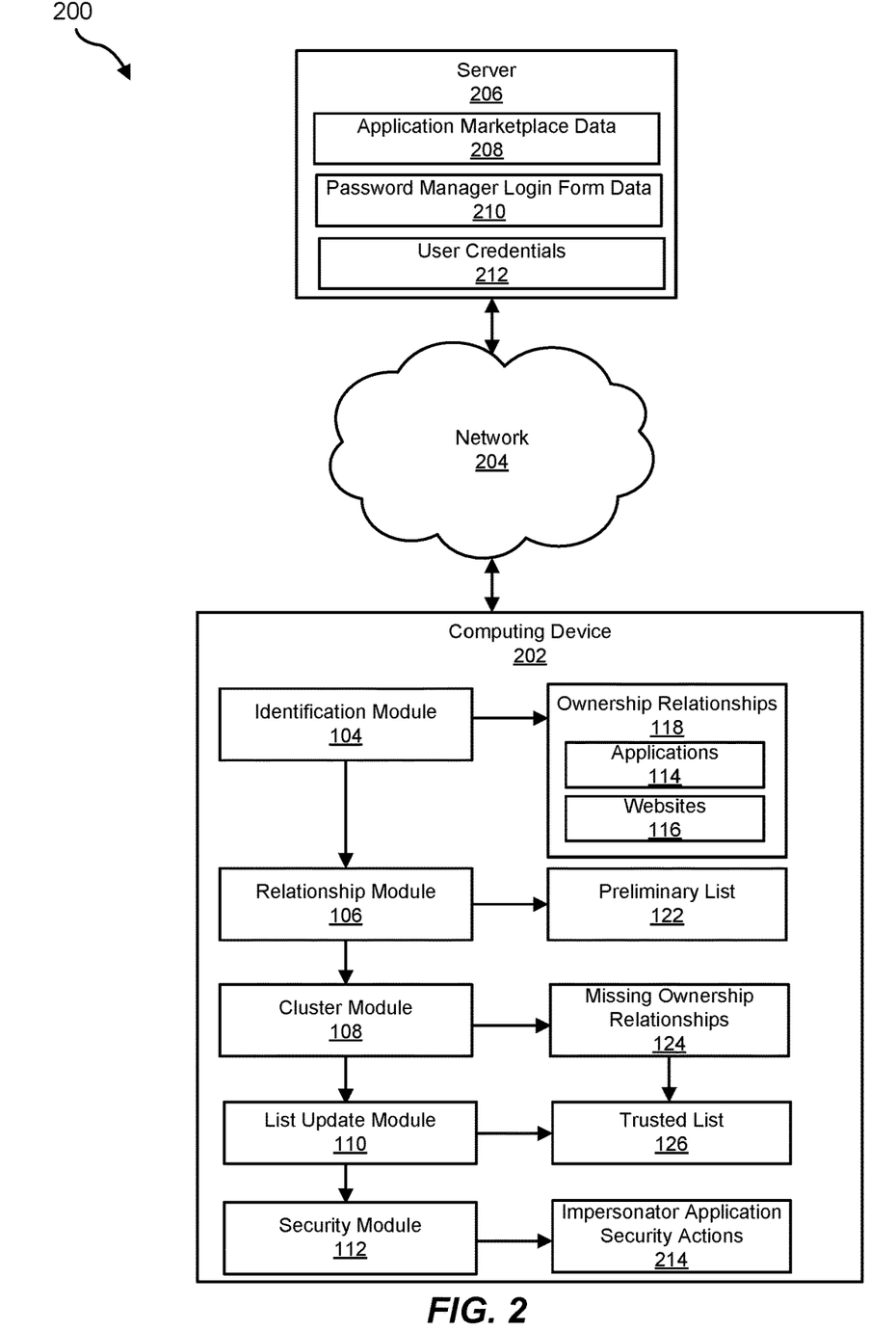
FIG. 2 is a block diagram of an additional example system for protecting against credential theft by impersonator applications.

The following will provide, with reference to FIGS. 1-2, detailed descriptions of example systems for protecting against credential theft by impersonator applications. Detailed descriptions of corresponding computer-implemented methods will also be provided in connection with FIGS. 3-4 and 6-7. Detailed descriptions of an example trusted list of applications and websites generated by the example systems of FIGS. 1 and 2, will also be provided in connection with FIG. 5. In addition, detailed descriptions of an example computing system and network architecture capable of implementing one or more of the embodiments described herein will be provided in connection with FIGS. 8 and 9, respectively.

FIG. 1 is a block diagram of an example system 100 for protecting against credential theft by impersonator applications. As illustrated in this figure, example system 100 may include one or more modules 102 for performing one or more tasks. For example, and as will be explained in greater detail below, example system 100 may include an identification module 104 that identifies ownership relationships 118 between each of a group of applications 114 (e.g., mobile device applications) and a group of websites 116. Example system 100 may additionally include a relationship module 106 that generates a preliminary list 122 containing applications 114 identified as having an ownership relationship 118 with websites 116. Example system 100 may also include a cluster module 108 that determines missing ownership relationships 124 for applications 114 and websites 116 in preliminary list 122. Example system 100 may additionally include a list update module 110 that updates preliminary list 122 with missing ownership relationships 124 to create trusted list 126 (i.e., a trusted list of applications and websites). Example system 100 may also include a security module 112 that protects against a credential theft attack by referencing trusted list 126 to detect potential impersonator applications attempting to steal user credentials. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

The term "ownership relationship" as used herein, generally refers to a verified attribution of ownership or association of an application (e.g., a mobile device application) with one or more specific websites (e.g., web domains) determined from cross-referencing trusted sources of information. For example, an ownership relationship between a social media mobile application and one or more social media websites may be determined by scraping the websites and mobile device application marketplaces to detect cross-references.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate protecting against credential theft by impersonator applications. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include a data storage 120 for storing data. In one example, data storage 120 may store applications 114, websites 116 (e.g., as URLs), ownership relationships 118, preliminary list 122, missing ownership relationships 124, and trusted list 126.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to protect against credential theft by impersonator applications.

For example, identification module 104 may identify ownership relationships 118 between applications 114 and websites 116. As will be explained in greater detail below, in some examples, ownership relationships 118 may be identified based on analyzing telemetry such as application marketplace data 208 and/or password manager login form data 210. Next, relationship module 106 may generate a preliminary list 122 containing applications 114 identified as having an ownership relationship 118 with websites 116. Then, cluster module 108 may determine missing ownership relationships 124 for applications 114 and websites 116 in preliminary list 122. Next, list update module 110 may update preliminary list 122 with missing ownership relationships 124 to create trusted list 126 (i.e., a trusted list of applications and websites). Finally, security module 112 may protect against a credential theft attack by performing impersonator application security actions 214 which may include referencing trusted list 126 to detect potential impersonator applications attempting to steal user credentials 212.

Computing device 202 generally represents any type or form of computing device capable of reading computer-executable instructions. In some examples, computing device 202 may represent an endpoint device, such as a smartphone or other mobile computing device, running password manager software providing an autofill feature for providing user credentials to access mobile applications. Additional examples of computing device 202 include, without limitation, laptops, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Server 206 generally represents any type or form of computing device that is capable of reading computer-executable instructions, In some examples, server 206 may be a security server that provides password management services for client computing devices over a network. Additionally, server 206 may also function as an application server for providing mobile applications for installation on networked mobile computing devices. Additional examples of server 206 include, without limitation, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
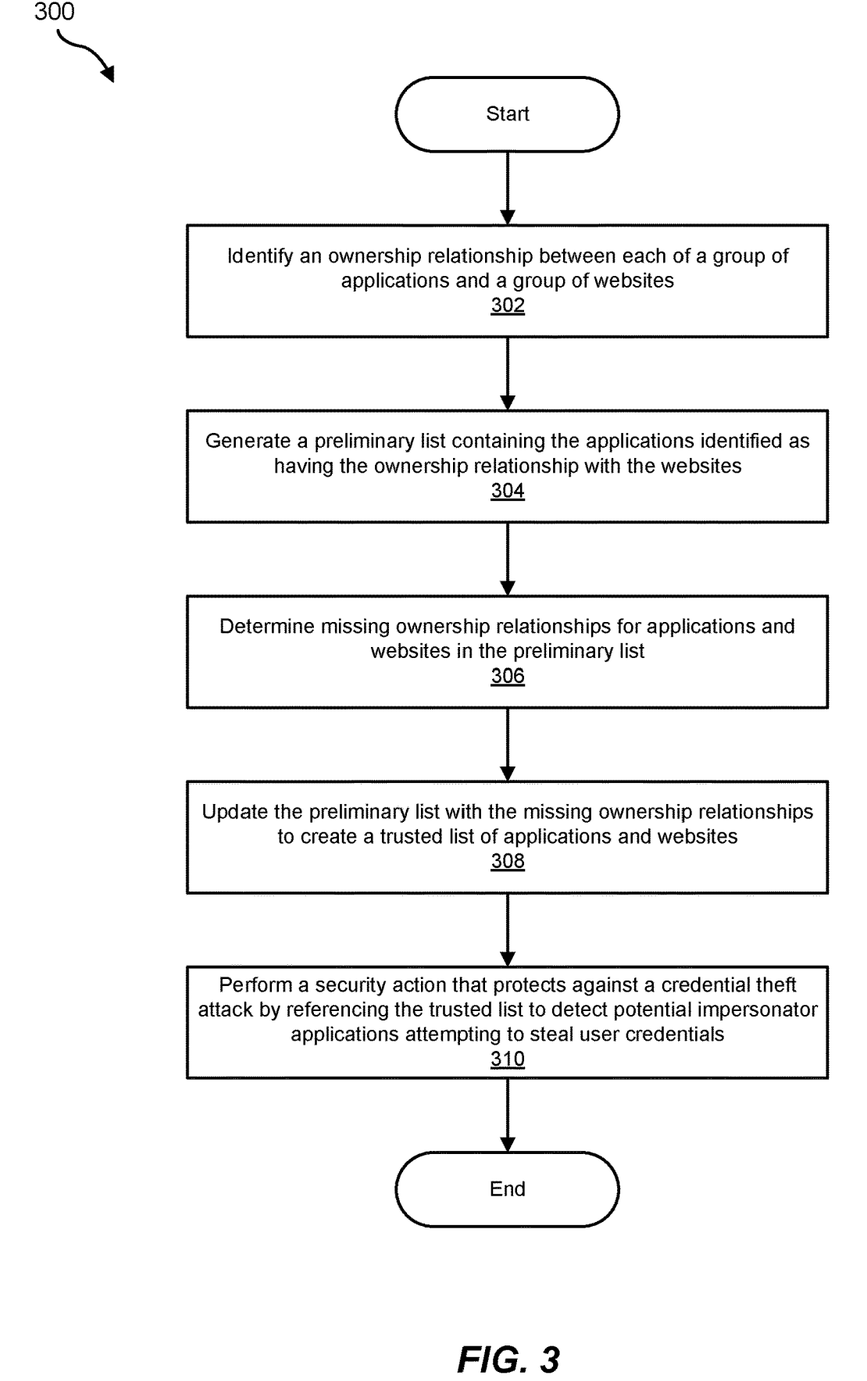
FIG. 3 is a flow diagram of an example method for protecting against credential theft by impersonator applications.

FIG. 3 is a flow diagram of an example computer-implemented method 300 for protecting against credential theft by impersonator applications. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may identify an ownership relationship between each of a group of applications and a group of websites. For example, identification module 104 may, as part of computing device 202 in FIG. 2, identify ownership relationships 118 for applications 114 and websites 116.

Identification module 104 may identify ownership relationships 118 in a variety of ways as will now be described with reference to the example computer-implemented method 400 in the flow diagram of FIG. 4. The steps shown in FIG. 4 may be performed by any suitable computer-executable code and/or computing system, including system 100 in FIG. 1, system 200 in FIG. 2, and/or variations or combinations of one or more of the same. In one example, each of the steps shown in FIG. 4 may represent an algorithm whose structure includes and/or is represented by multiple sub-steps, examples of which will be provided in greater detail below.

Figure 4:
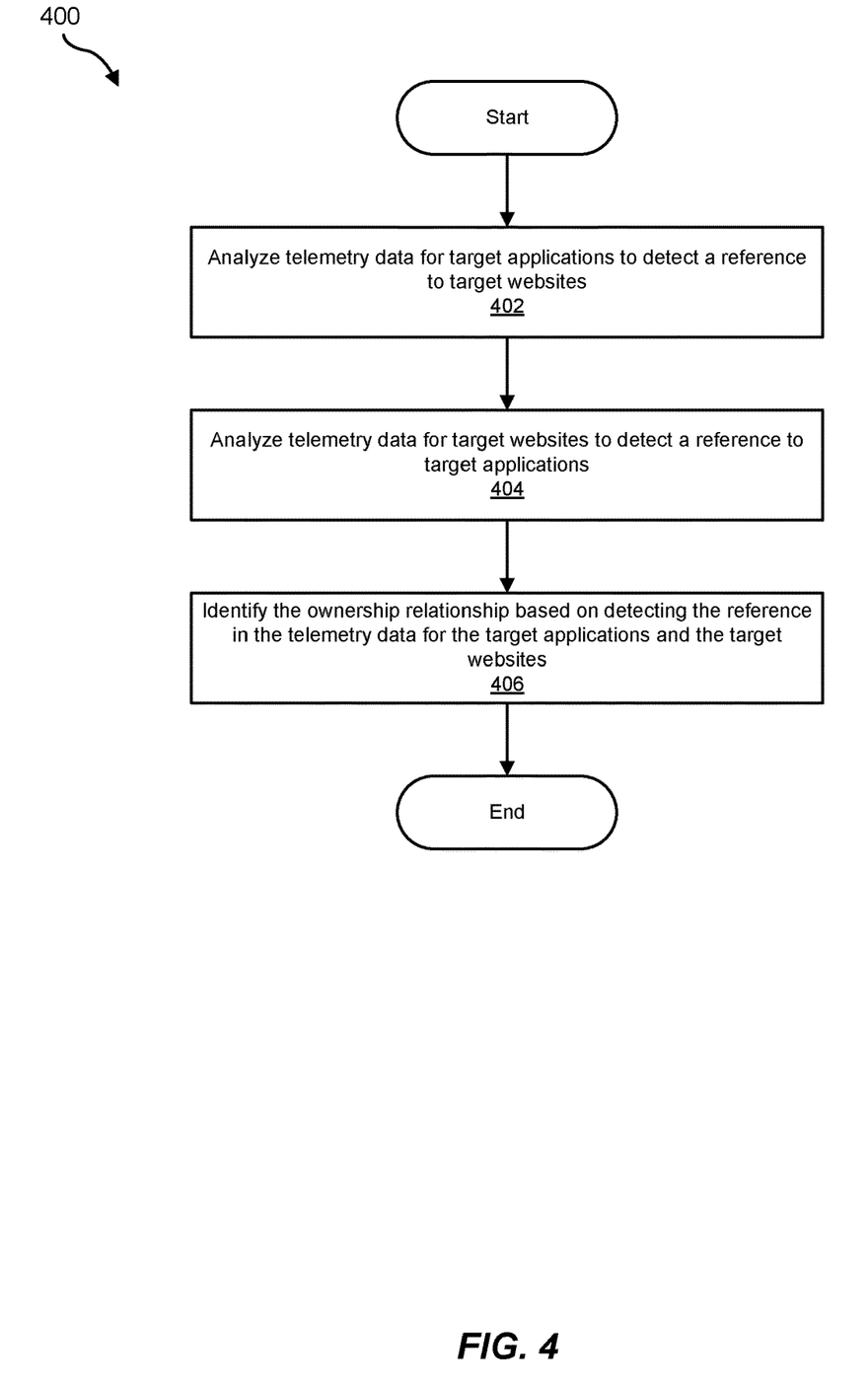
FIG. 4 is a flow diagram of an additional example method for protecting against credential theft by impersonator applications.

As illustrated in FIG. 4, at step 402, one or more of the systems described herein may analyze telemetry data for a group of applications (i.e., target applications) to detect any references to a group of websites (i.e., target websites). For example, identification module 104 may, as part of computing device 202 in FIG. 2, analyze telemetry data for applications 114 to detect references to websites 116. In some examples, the telemetry data for applications 114 may include application marketplace data 208. In some embodiments, identification module 104 may be configured to scrape (e.g., access) application marketplace data 208 associated with applications 114 to identify references to any websites 116. For example, application marketplace data 208 for an application 114 (e.g., a social media mobile application) may include a reference to a website 116 (e.g., a social media website).

At step 404, one or more of the systems described herein may analyze telemetry data for a group of websites (i.e., target websites) to detect a reference to a group of applications (i.e., target applications). For example, identification module 104 may, as part of computing device 202 in FIG. 2, analyze telemetry data for websites 116 to detect references to applications 114. In some examples, the telemetry data for websites 116 may include password manager login form data 210.

At step 406, one or more of the systems described herein may identify the ownership relationship based on detecting the reference in the telemetry data for the target applications and the target websites. For example, identification module 104 may, as part of computing device 202 in FIG. 2, identify an ownership relationship 118 between an application 114 and a website 116 based on a reference detected in application marketplace data 208 and/or password manager login form data 210.

Returning now to FIG. 3, at step 304, one or more of the systems described herein may generate a preliminary list containing the applications identified as having the ownership relationship with the websites. For example, relationship module 106 may, as part of computing device 202 in FIG. 2, generate preliminary list 122 containing applications 114 identified at step 302 as having ownership relationships 118 with websites 116.

At step 306, one or more of the systems described herein may determine missing ownership relationships for applications and websites in the preliminary list. For example, cluster module 108 may, as part of computing device 202 in FIG. 2, determine missing ownership relationships 124 for applications 114 and websites 116 in preliminary list 122.

Cluster module 108 may determine missing ownership relationships 124 in a variety of ways. In some examples, cluster module 108 may detecting that an application signature for at least one additional application (i.e., an application 114 not appearing in preliminary list 122) is related to an application signature for an application 114 that is included in preliminary list 122. Additionally, cluster module 108 may also detect that a website certificate for at least one additional website (i.e., a website 116 not appearing in preliminary list 122) is related to a website certificate for a website 116 that is included in preliminary list 122.

At step 308, one or more of the systems described herein may update the preliminary list with the missing ownership relationships (determined at step 306) to create a trusted list of applications and websites. For example, list update module 110 may, as part of computing device 202 in FIG. 2, update preliminary list 122 with missing ownership relationships 124 to created trusted list 126.

Figure 5:
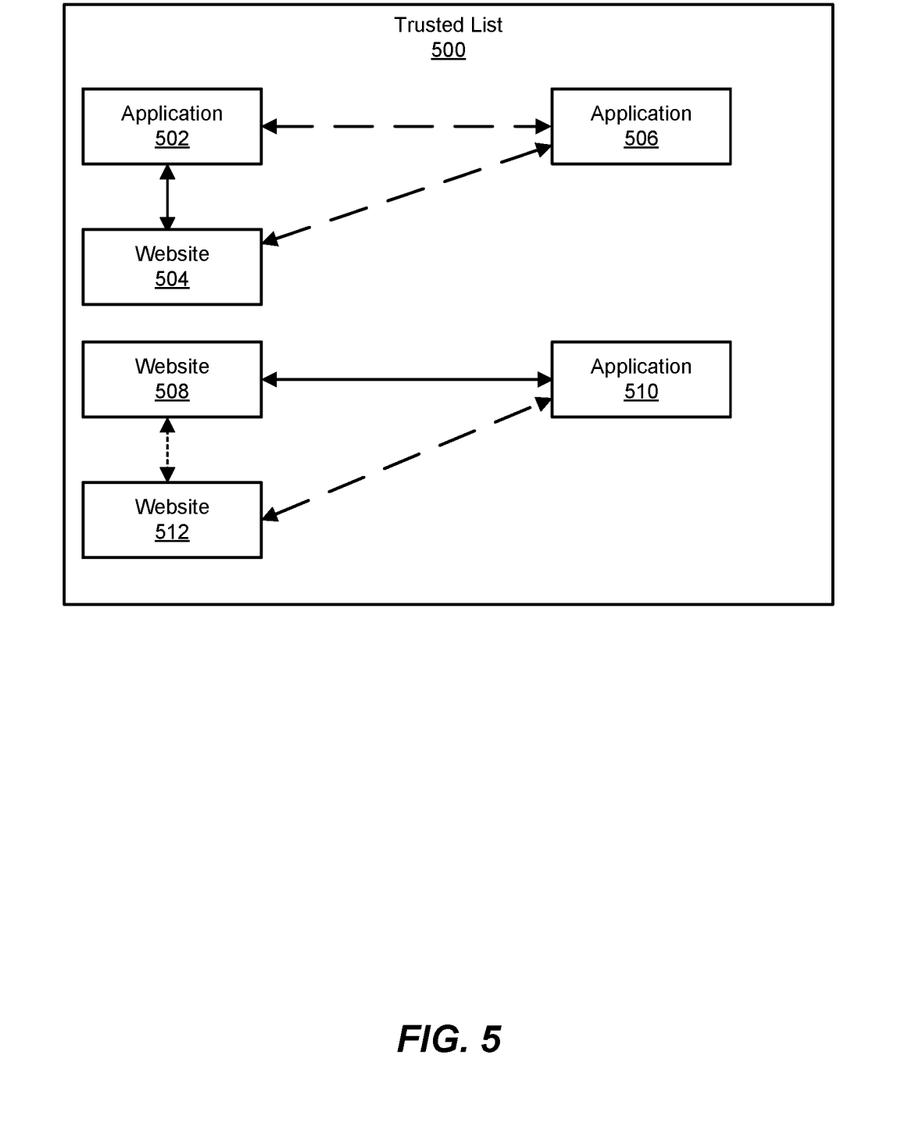
FIG. 5 is a block diagram of an example trusted list of applications and websites generated by the example systems of FIGS. 1 and 2.

In some examples, and as shown in FIG. 5, a trusted list 500 may include ownership relationships 118 identified in preliminary list 122 between application 502 and website 504 as well as missing ownership relationships 124 identified between application 502 and application 506, which (as a result of the association of application 502 with website 504) also creates an association between application 506 and website 504. Similarly, trusted list 500 may also include ownership relationships 118 identified in preliminary list 122 between website 508 and application 510 as well as missing ownership relationships 124 identified between website 508 and website 512, which (as a result of the association of website 508 with website 512) also creates an association between website 512 and application 510.

At step 310, one or more of the systems described herein may perform a security action that protects against a credential theft attack by referencing the trusted list to detect potential impersonator applications attempting to steal user credentials. For example, security module 112 may, as part of computing device 202 in FIG. 2, perform impersonator application security actions 214 that protect against a credential theft attack by referencing trusted list 126 to detect potential impersonator applications attempting to steal user credentials 212.

Security module 112 may perform impersonator application security actions 214 in a variety of ways as will now be described with reference to the example computer-implemented methods 600 and 700 in the flow diagrams of FIGS. 6-7. The steps shown in FIGS. 6-7 may be performed by any suitable computer-executable code and/or computing system, including system 100 in FIG. 1, system 200 in FIG. 2, and/or variations or combinations of one or more of the same. In one example, each of the steps shown in FIGS. 6-7 may represent an algorithm whose structure includes and/or is represented by multiple sub-steps, examples of which will be provided in greater detail below.

Figure 6:
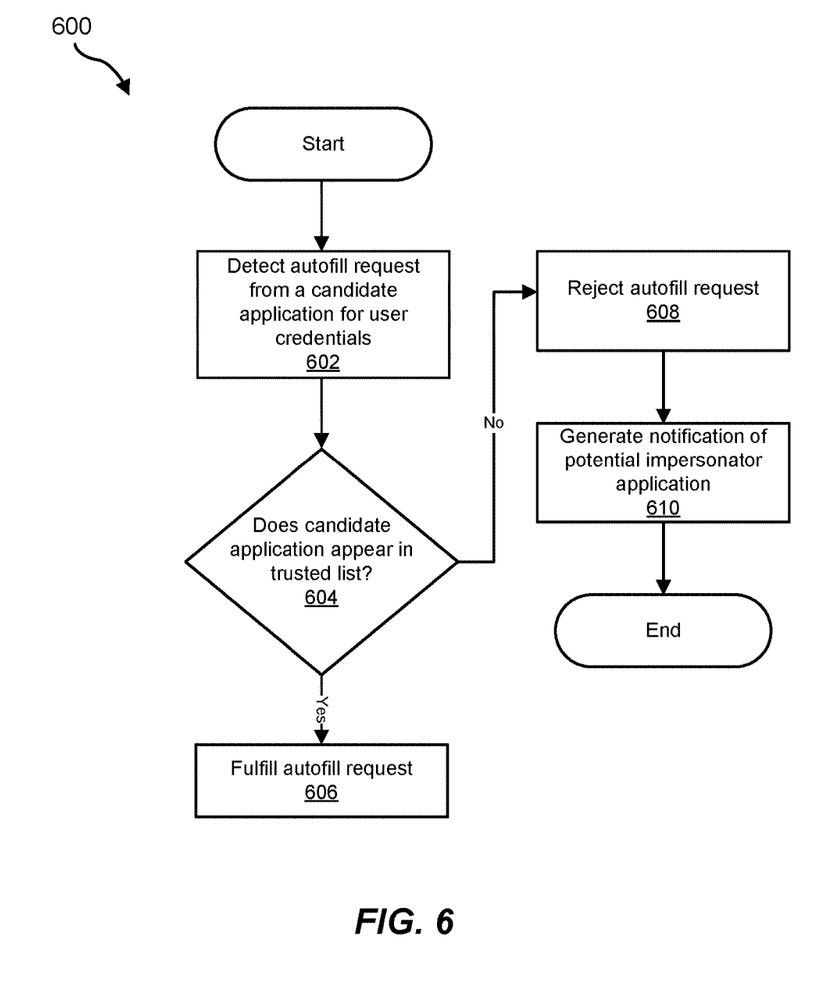
FIG. 6 is a flow diagram of an additional example method for protecting against credential theft by impersonator applications.

Turning now to FIG. 6, at step 602, one or more of the systems described herein may detect an autofill request from a candidate application for user credentials. For example, security module 112 may, as part of computing device 202 in FIG. 2, detect an autofill request (e.g., from a password manager running on computing device 202) from an application 114 for user credentials 212.

At step 604, one or more of the systems described herein may determine if the candidate application appears in the trusted list. For example, security module 112 may, as part of computing device 202 in FIG. 2, compare the candidate application (i.e., an application 114) to trusted list 126 to determine if application 114 appears therein. If, at step 604, security module 112 determines that the candidate application appears in trusted list 126, then, at step 606, security module 112 fulfills the autofill request detected at step 602.

However, if, at step 604, security module 112 determines that the candidate application is absent from trusted list 126, then method 600 continues to step 608 where security module 112 rejects the autofill request. Then, at step 610, security module 112 may generate a notification that the candidate application is a potential impersonator application to a user of computing device 202.

Figure 7:
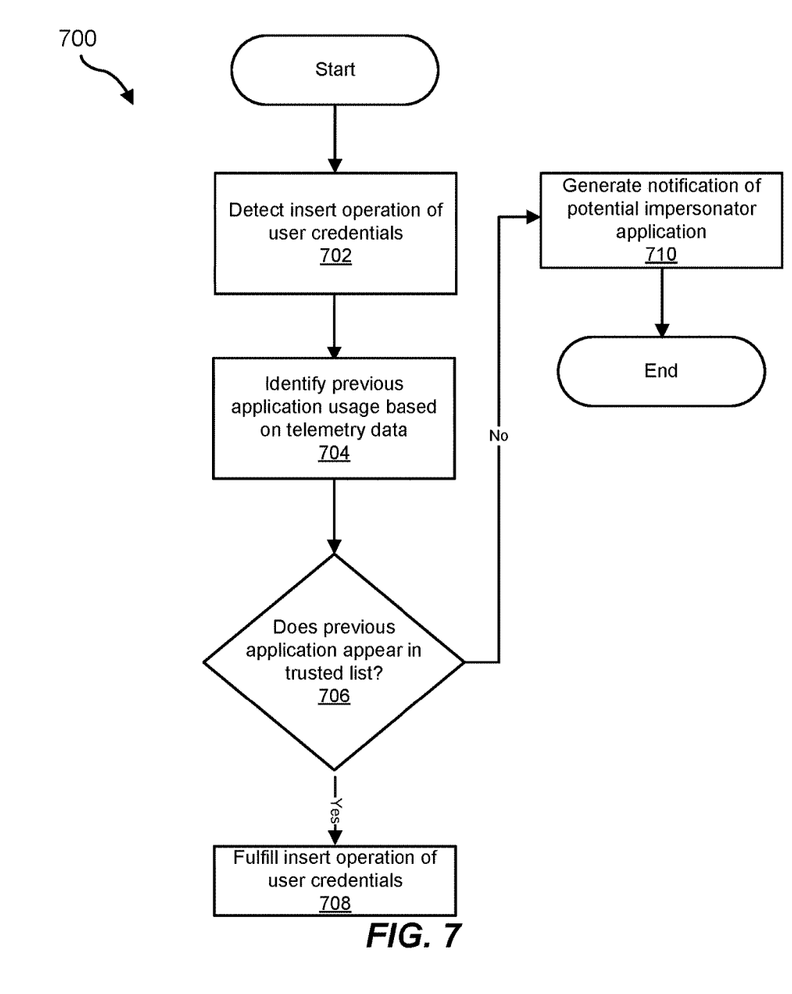
FIG. 7 is a flow diagram of an additional example method for protecting against credential theft by impersonator applications.

Turning now to FIG. 7, at step 702, one or more of the systems described herein may detect an insert operation (e.g., a copy or cut operation) of user credentials by a user. For example, security module 112 may, as part of computing device 202 in FIG. 2, detect an insert operation of user credentials 212 by a user for inputting into a credentials field (e.g., a password field) for accessing an (unknown) application 114 on computing device 202.

At step 704, one or more of the systems described herein may identify a previous application usage (by the user) based on telemetry data. For example, security module 112 may, as part of computing device 202 in FIG. 2, check which of applications 114 a user was previously using (e.g., by accessing mobile operating system usage statistics).

At step 706, one or more of the systems described herein may determine if the previous application appears in the trusted list. For example, security module 112 may, as part of computing device 202 in FIG. 2, compare the previous application to trusted list 126 to determine if it appears therein. If, at step 706, security module 112 determines that the previous application appears in trusted list 126, then, at step 708, security module 112 fulfills the insert operation of user credentials 212 detected at step 702.

However, if, at step 706, security module 112 determines that the previous application is absent from trusted list 126, then method 700 continues to step 710 where security module 112 generates a notification that the previous application is a potential impersonator application to a user of computing device 202. In some examples, the notification may be generated prior to the user inserting (e.g., via a paste operation) user credentials 212 into a credentials field for accessing an application on computing device 202.

As explained in connection with method 300 above, the systems and methods described herein provide for protecting against credential theft by impersonator applications. By utilizing multiple data sources (e.g., website and application marketplace telemetry), the systems and methods described herein may create a list that attributes ownership of applications to specific websites and further utilize dynamic impersonation detection to prevent password managers from utilizing "autofill" credential functionality and/or prevent users from providing credentials to non-listed applications that may be potential application impersonators. By generating the application attribution ownership lists and utilizing dynamic impersonation in this way, the systems and methods described herein may provide to provide for the automatic and platform agnostic identification of likely impersonator applications targeting both password manager applications and mobile device users, thereby preventing credential theft by malicious actors.

Figure 8:
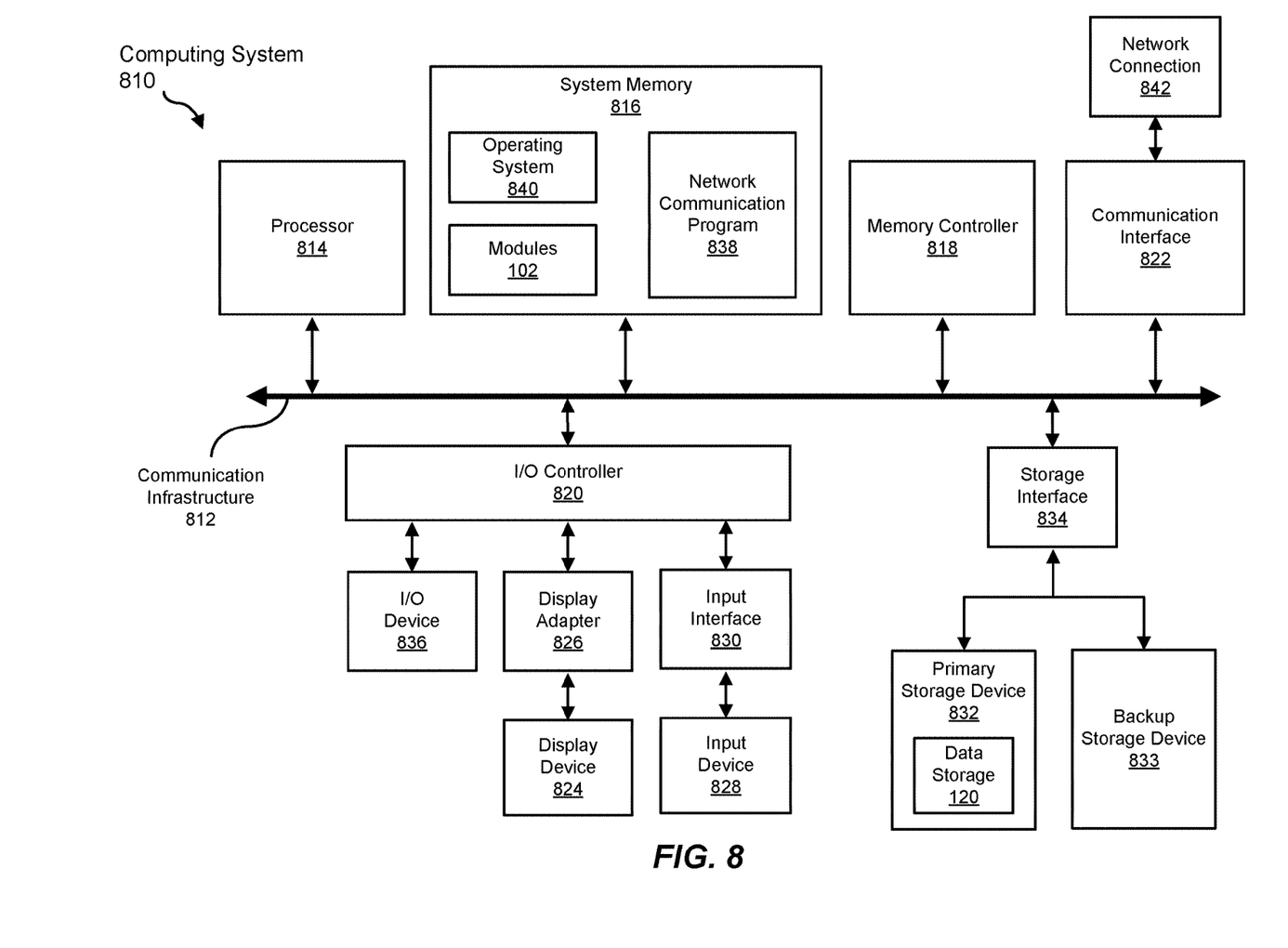
FIG. 8 is a block diagram of an example computing system capable of implementing one or more of the embodiments described and/or illustrated herein.

FIG. 8 is a block diagram of an example computing system 810 capable of implementing one or more of the embodiments described and/or illustrated herein. For example, all or a portion of computing system 810 may perform and/or be a means for performing, either alone or in combination with other elements, one or more of the steps described herein (such as one or more of the steps illustrated in FIG. 3). All or a portion of computing system 810 may also perform and/or be a means for performing any other steps, methods, or processes described and/or illustrated herein.

Computing system 810 broadly represents any single or multi-processor computing device or system capable of executing computer-readable instructions. Examples of computing system 810 include, without limitation, workstations, laptops, client-side terminals, servers, distributed computing systems, handheld devices, or any other computing system or device. In its most basic configuration, computing system 810 may include at least one processor 814 and a system memory 816.

Processor 814 generally represents any type or form of physical processing unit (e.g., a hardware-implemented central processing unit) capable of processing data or interpreting and executing instructions. In certain embodiments, processor 814 may receive instructions from a software application or module. These instructions may cause processor 814 to perform the functions of one or more of the example embodiments described and/or illustrated herein.

System memory 816 generally represents any type or form of volatile or non-volatile storage device or medium capable of storing data and/or other computer-readable instructions. Examples of system memory 816 include, without limitation, Random Access Memory (RAM), Read Only Memory (ROM), flash memory, or any other suitable memory device. Although not required, in certain embodiments computing system 810 may include both a volatile memory unit (such as, for example, system memory 816) and a non-volatile storage device (such as, for example, primary storage device 832, as described in detail below). In one example, one or more of modules 102 from FIG. 1 may be loaded into system memory 816.

In some examples, system memory 816 may store and/or load an operating system 840 for execution by processor 814. In one example, operating system 840 may include and/or represent software that manages computer hardware and software resources and/or provides common services to computer programs and/or applications on computing system 810. Examples of operating system 840 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 810 may also include one or more components or elements in addition to processor 814 and system memory 816. For example, as illustrated in FIG. 8, computing system 810 may include a memory controller 818, an Input/Output (I/O) controller 820, and a communication interface 822, each of which may be interconnected via a communication infrastructure 812. Communication infrastructure 812 generally represents any type or form of infrastructure capable of facilitating communication between one or more components of a computing device. Examples of communication infrastructure 812 include, without limitation, a communication bus (such as an Industry Standard Architecture (ISA), Peripheral Component Interconnect (PCI), PCI Express (PCIe), or similar bus) and a network.

Memory controller 818 generally represents any type or form of device capable of handling memory or data or controlling communication between one or more components of computing system 810. For example, in certain embodiments memory controller 818 may control communication between processor 814, system memory 816, and I/O controller 820 via communication infrastructure 812.

I/O controller 820 generally represents any type or form of module capable of coordinating and/or controlling the input and output functions of a computing device. For example, in certain embodiments I/O controller 820 may control or facilitate transfer of data between one or more elements of computing system 810, such as processor 814, system memory 816, communication interface 822, display adapter 826, input interface 830, and storage interface 834.

As illustrated in FIG. 8, computing system 810 may also include at least one display device 824 coupled to I/O controller 820 via a display adapter 826. Display device 824 generally represents any type or form of device capable of visually displaying information forwarded by display adapter 826. Similarly, display adapter 826 generally represents any type or form of device configured to forward graphics, text, and other data from communication infrastructure 812 (or from a frame buffer, as known in the art) for display on display device 824.

As illustrated in FIG. 8, example computing system 810 may also include at least one input device 828 coupled to I/O controller 820 via an input interface 830. Input device 828 generally represents any type or form of input device capable of providing input, either computer or human generated, to example computing system 810. Examples of input device 828 include, without limitation, a keyboard, a pointing device, a speech recognition device, variations or combinations of one or more of the same, and/or any other input device.

Additionally or alternatively, example computing system 810 may include additional I/O devices. For example, example computing system 810 may include I/O device 836. In this example, I/O device 836 may include and/or represent a user interface that facilitates human interaction with computing system 810. Examples of I/O device 836 include, without limitation, a computer mouse, a keyboard, a monitor, a printer, a modem, a camera, a scanner, a microphone, a touchscreen device, variations or combinations of one or more of the same, and/or any other I/O device.

Communication interface 822 broadly represents any type or form of communication device or adapter capable of facilitating communication between example computing system 810 and one or more additional devices. For example, in certain embodiments communication interface 822 may facilitate communication between computing system 810 and a private or public network including additional computing systems. Examples of communication interface 822 include, without limitation, a wired network interface (such as a network interface card), a wireless network interface (such as a wireless network interface card), a modem, and any other suitable interface. In at least one embodiment, communication interface 822 may provide a direct connection to a remote server via a direct link to a network, such as the Internet. Communication interface 822 may also indirectly provide such a connection through, for example, a local area network (such as an Ethernet network), a personal area network, a telephone or cable network, a cellular telephone connection, a satellite data connection, or any other suitable connection.

In certain embodiments, communication interface 822 may also represent a host adapter configured to facilitate communication between computing system 810 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 822 may also allow computing system 810 to engage in distributed or remote computing. For example, communication interface 822 may receive instructions from a remote device or send instructions to a remote device for execution.

In some examples, system memory 816 may store and/or load a network communication program 838 for execution by processor 814. In one example, network communication program 838 may include and/or represent software that enables computing system 810 to establish a network connection 842 with another computing system (not illustrated in FIG. 8) and/or communicate with the other computing system by way of communication interface 822. In this example, network communication program 838 may direct the flow of outgoing traffic that is sent to the other computing system via network connection 842. Additionally or alternatively, network communication program 838 may direct the processing of incoming traffic that is received from the other computing system via network connection 842 in connection with processor 814.

Although not illustrated in this way in FIG. 8, network communication program 838 may alternatively be stored and/or loaded in communication interface 822. For example, network communication program 838 may include and/or represent at least a portion of software and/or firmware that is executed by a processor and/or Application Specific Integrated Circuit (ASIC) incorporated in communication interface 822.

As illustrated in FIG. 8, example computing system 810 may also include a primary storage device 832 and a backup storage device 833 coupled to communication infrastructure 812 via a storage interface 834. Storage devices 832 and 833 generally represent any type or form of storage device or medium capable of storing data and/or other computer-readable instructions. For example, storage devices 832 and 833 may be a magnetic disk drive (e.g., a so-called hard drive), a solid state drive, a floppy disk drive, a magnetic tape drive, an optical disk drive, a flash drive, or the like. Storage interface 834 generally represents any type or form of interface or device for transferring data between storage devices 832 and 833 and other components of computing system 810. In one example, data storage 120 from FIG. 1 may be stored and/or loaded in primary storage device 832.

In certain embodiments, storage devices 832 and 833 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 832 and 833 may also include other similar structures or devices for allowing computer software, data, or other computer-readable instructions to be loaded into computing system 810. For example, storage devices 832 and 833 may be configured to read and write software, data, or other computer-readable information. Storage devices 832 and 833 may also be a part of computing system 810 or may be a separate device accessed through other interface systems.

Many other devices or subsystems may be connected to computing system 810. Conversely, all of the components and devices illustrated in FIG. 8 need not be present to practice the embodiments described and/or illustrated herein. The devices and subsystems referenced above may also be interconnected in different ways from that shown in FIG. 8. Computing system 810 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 810. All or a portion of the computer program stored on the computer-readable medium may then be stored in system memory 816 and/or various portions of storage devices 832 and 833. When executed by processor 814, a computer program loaded into computing system 810 may cause processor 814 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 810 may be configured as an Application Specific Integrated Circuit (ASIC) adapted to implement one or more of the example embodiments disclosed herein.

Figure 9:
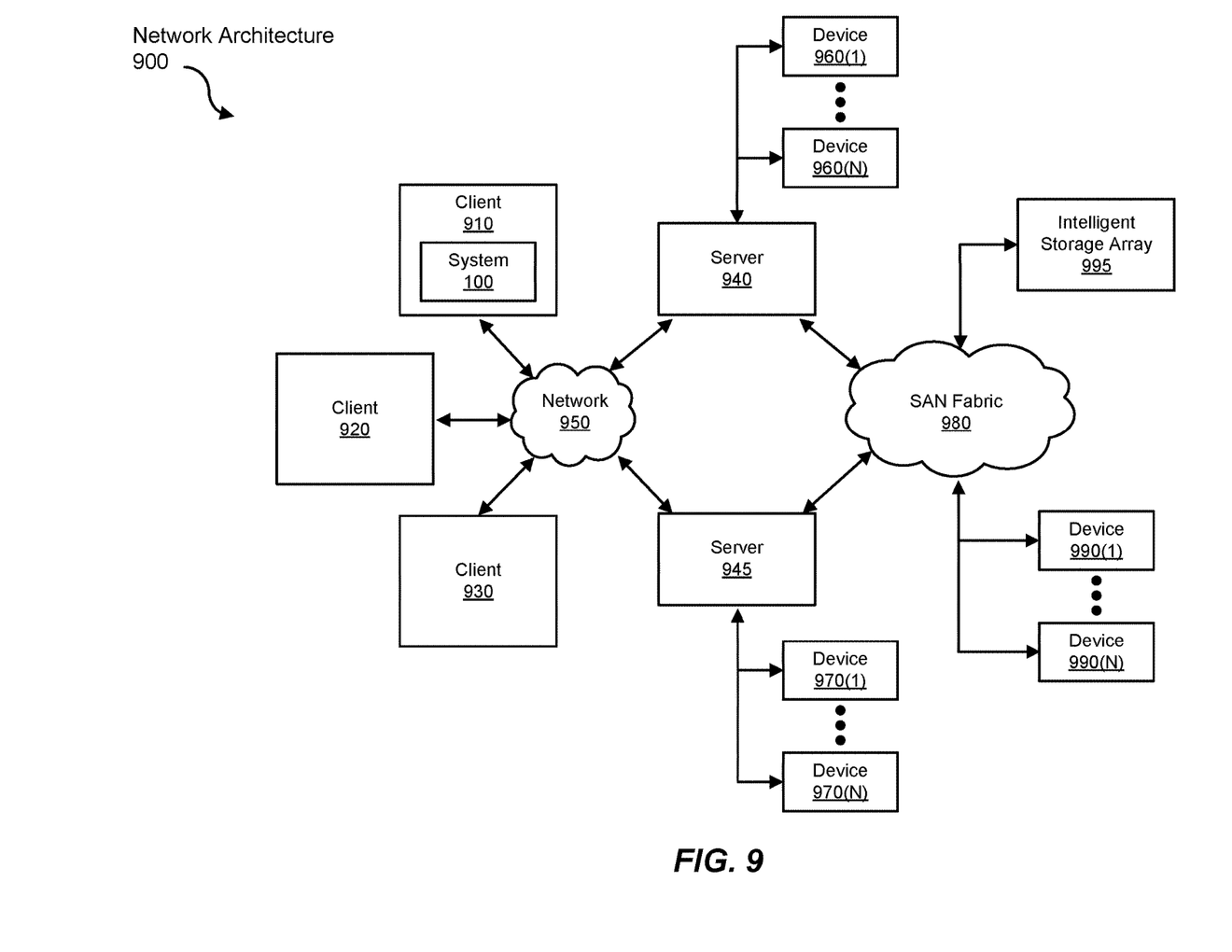
FIG. 9 is a block diagram of an example computing network capable of implementing one or more of the embodiments described and/or illustrated herein.

FIG. 9 is a block diagram of an example network architecture 900 in which client systems 910, 920, and 930 and servers 940 and 945 may be coupled to a network 950. As detailed above, all or a portion of network architecture 900 may perform and/or be a means for performing, either alone or in combination with other elements, one or more of the steps disclosed herein (such as one or more of the steps illustrated in FIG. 3). All or a portion of network architecture 900 may also be used to perform and/or be a means for performing other steps and features set forth in the present disclosure.

Client systems 910, 920, and 930 generally represent any type or form of computing device or system, such as example computing system 810 in FIG. 8. Similarly, servers 940 and 945 generally represent computing devices or systems, such as application servers or database servers, configured to provide various database services and/or run certain software applications. Network 950 generally represents any telecommunication or computer network including, for example, an intranet, a WAN, a LAN, a PAN, or the Internet. In one example, client systems 910, 920, and/or 930 and/or servers 940 and/or 945 may include all or a portion of system 100 from FIG. 1.

As illustrated in FIG. 9, one or more storage devices 960(1)-(N) may be directly attached to server 940. Similarly, one or more storage devices 970(1)-(N) may be directly attached to server 945. Storage devices 960(1)-(N) and storage devices 970(1)-(N) generally represent any type or form of storage device or medium capable of storing data and/or other computer-readable instructions. In certain embodiments, storage devices 960(1)-(N) and storage devices 970(1)-(N) may represent Network-Attached Storage (NAS) devices configured to communicate with servers 940 and 945 using various protocols, such as Network File System (NFS), Server Message Block (SMB), or Common Internet File System (CIFS).

Servers 940 and 945 may also be connected to a Storage Area Network (SAN) fabric 980. SAN fabric 980 generally represents any type or form of computer network or architecture capable of facilitating communication between a plurality of storage devices. SAN fabric 980 may facilitate communication between servers 940 and 945 and a plurality of storage devices 990(1)-(N) and/or an intelligent storage array 995. SAN fabric 980 may also facilitate, via network 950 and servers 940 and 945, communication between client systems 910, 920, and 930 and storage devices 990(1)-(N) and/or intelligent storage array 995 in such a manner that devices 990(1)-(N) and array 995 appear as locally attached devices to client systems 910, 920, and 930. As with storage devices 960(1)-(N) and storage devices 970(1)-(N), storage devices 990(1)-(N) and intelligent storage array 995 generally represent any type or form of storage device or medium capable of storing data and/or other computer-readable instructions.

In certain embodiments, and with reference to example computing system 810 of FIG. 8, a communication interface, such as communication interface 822 in FIG. 8, may be used to provide connectivity between each client system 910, 920, and 930 and network 950. Client systems 910, 920, and 930 may be able to access information on server 940 or 945 using, for example, a web browser or other client software. Such software may allow client systems 910, 920, and 930 to access data hosted by server 940, server 945, storage devices 960(1)-(N), storage devices 970(1)-(N), storage devices 990(1)-(N), or intelligent storage array 995. Although FIG. 9 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 940, server 945, storage devices 960(1)-(N), storage devices 970(1)-(N), storage devices 990(1)-(N), intelligent storage array 995, or any combination thereof. All or a portion of one or more of the example embodiments disclosed herein may also be encoded as a computer program, stored in server 940, run by server 945, and distributed to client systems 910, 920, and 930 over network 950.

As detailed above, computing system 810 and/or one or more components of network architecture 900 may perform and/or be a means for performing, either alone or in combination with other elements, one or more steps of an example method for protecting against credential theft by impersonator applications.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for protecting against credential theft by impersonator applications, at least a portion of the method being performed by one or more computing devices comprising at least one processor, the method comprising:
   identifying, by the one or more computing devices, an ownership relationship between each of a plurality of applications and a plurality of websites;
   generating, by the one or more computing devices, a preliminary list containing the plurality of applications identified as having the ownership relationship with the plurality of websites;
   determining, by the one or more computing devices, missing ownership relationships for one or more of the plurality of applications and one or more of the plurality of websites in the preliminary list based on identifying at least one application or website that is related to the one or more of the plurality of applications or the one or more of the plurality of websites and that is missing from the preliminary list;
   updating, by the one or more computing devices, the preliminary list with the missing ownership relationships to create a trusted list of applications and websites; and
   performing, by the one or more computing devices, a security action that protects against a credential theft attack by referencing the trusted list to detect potential impersonator applications attempting to steal user credentials.

2. The computer-implemented method of claim 1, wherein identifying the ownership relationship comprises:
   analyzing telemetry data for one or more target applications in the plurality of applications to detect a reference to one or more target websites in the plurality of websites;
   analyzing telemetry data for the one or more target websites to detect a reference to the one or more target applications; and
   identifying the ownership relationship based on detecting the reference in the telemetry data for the one more or target applications and the one or more target websites.

3. The computer-implemented method of claim 2, wherein analyzing the telemetry data for the one or more target applications comprises accessing application marketplace data associated with the target applications.

4. The computer-implemented method of claim 2, wherein analyzing the telemetry data for the one or more target websites comprises accessing password manager login form data.

5. The computer-implemented method of claim 1, wherein:
   determining the missing ownership relationships for the one or more of the plurality of applications and the one or more of the plurality of websites in the preliminary list comprises detecting that an application signature for at least one additional application that is missing from the preliminary list is related to an application signature for the one or more of the plurality of applications in the preliminary list; and
   updating the preliminary list with the missing ownership relationships comprises adding the at least one additional application to the preliminary list to create the trusted list.

6. The computer-implemented method of claim 1, wherein:
   determining the missing ownership relationships for the one or more of the plurality of applications and the one or more of the plurality of websites in the preliminary list comprises detecting that a website certificate for at least one additional website that is missing from the preliminary list is related to a website certificate for the one or more of the plurality of websites in the preliminary list; and
   updating the preliminary list with the missing ownership relationships comprises adding the at least one additional website to the preliminary list to create the trusted list.

7. The computer-implemented method of claim 1, wherein performing the security action comprises:
   detecting an autofill request from a candidate application for the user credentials;
   comparing the candidate application to the trusted list of applications and websites; and
   determining that the candidate application is a potential impersonator application when the candidate application is absent from the trusted list of applications and websites.

8. The computer-implemented method of claim 7, further comprising:
   rejecting the autofill request; and
   generating a notification of the potential impersonator application.

9. The computer-implemented method of claim 1, wherein performing the security action comprises:
   detecting an insert operation of user credentials for accessing an unknown application by a user;
   identifying, based on application usage telemetry data, a previous application utilized by the user;
   comparing the previous application to the trusted list of applications and websites; and
   determining that the previous application is a potential impersonator application when the previous application is absent from the trusted list of applications and websites.

10. The computer-implemented method of claim 9, further comprising generating a notification of the potential impersonator application.

11. A system for protecting against credential theft by impersonator applications, the system comprising:
at least one physical processor;
physical memory comprising computer-executable instructions and one or more modules that, when executed by the physical processor, cause the physical processor to:
identify, by an identification module, an ownership relationship between each of a plurality of applications and a plurality of websites;
generate, by a relationship module, a preliminary list containing the plurality of applications identified as having the ownership relationship with the plurality of websites;
determine, by a cluster module, missing ownership relationships for one or more of the plurality of applications and one or more of the plurality of websites in the preliminary list based on identifying at least one application or website that is related to the one or more of the plurality of applications or the one or more of the plurality of websites and that is missing from the preliminary list;
update, by a list update module, the preliminary list with the missing ownership relationships to create a trusted list of applications and websites; and
perform, by a security module, a security action that protects against a credential theft attack by referencing the trusted list to detect potential impersonator applications attempting to steal user credentials.

12. The system of claim 11, wherein the identification module identifies the ownership relationship by:
analyzing telemetry data for one or more target applications in the plurality of applications to detect a reference to one or more target websites in the plurality of websites;
analyzing telemetry data for the one or more target websites to detect a reference to the one or more target applications; and
identifying the ownership relationship based on detecting the reference in the telemetry data for the one more or target applications and the one or more target websites.

13. The system of claim 12, wherein the identification module analyzes the telemetry data for the one or more target applications by accessing application marketplace data associated with the target applications.

14. The system of claim 12, wherein the identification module analyzes the telemetry data for the one or more target websites comprises by password manager login form data.

15. The system of claim 11, wherein:
the cluster module determines the missing ownership relationships for the one or more of the plurality of applications and the one or more of the plurality of websites in the preliminary list by detecting that an application signature for at least one additional application that is missing from the preliminary list is related to an application signature for the one or more of the plurality of applications in the preliminary list; and
the update module updates the preliminary list with the missing ownership relationships by adding the at least one additional application to the preliminary list to create the trusted list.

16. The system of claim 11, wherein:
the cluster module determines the missing ownership relationships for the one or more of the plurality of applications and the one or more of the plurality of websites in the preliminary list by detecting that a website certificate for at least one additional website that is missing from the preliminary list is related to a website certificate for the one or more of the plurality of websites in the preliminary list; and
the update module updates the preliminary list with the missing ownership relationships by adding the at least one additional website to the preliminary list to create the trusted list.

17. The system of claim 11, wherein the security module performs the security action by:
detecting an autofill request from a candidate application for the user credentials;
comparing the candidate application to the trusted list of applications and websites; and
determining that the candidate application is a potential impersonator application when the candidate application is absent from the trusted list of applications and websites.

18. The system of claim 17, wherein the security module further performs the security action by:
rejecting the autofill request; and
generating a notification of the potential impersonator application.

19. The system of claim 11, wherein the security module performs the security action by:
detecting an insert operation of user credentials for accessing an unknown application by a user;
identifying, based on application usage telemetry data, a previous application utilized by the user;
comparing the previous application to the trusted list of applications and websites;
determining that the previous application is a potential impersonator application when the previous application is absent from the trusted list of applications and websites; and
generating a notification of the potential impersonator application.

20. A non-transitory computer-readable medium comprising one or more computer-executable instructions that, when executed by at least one processor of a computing device, cause the computing device to:
identify an ownership relationship between each of a plurality of applications and a plurality of websites;
generate a preliminary list containing the plurality of applications identified as having the ownership relationship with the plurality of websites;
determine missing ownership relationships for one or more of the plurality of applications and one or more of the plurality of websites in the preliminary list based on identifying at least one application or website that is related to the one or more of the plurality of applications or the one or more of the plurality of websites and that is missing from the preliminary list;
update the preliminary list with the missing ownership relationships to create a trusted list of applications and websites; and
perform a security action that protects against a credential theft attack by referencing the trusted list to detect potential impersonator applications attempting to steal user credentials.

* * * * *